UNITED STATES PATENT OFFICE 2,671,116

POLYGLYCOL ETHERS OF 2,6,8-TRIMETHYL-NONANOL-4 AND PROCESS OF MAKING SAME

Milton Kosmin, Dayton, Ohio, assignor to Monsanto Chemical Company, St. Louis, Mo., a corporation of Delaware No Drawing. Application October 20, 1950,
Serial No. 191,319

5 Claims. (Cl. 260—615)

The present invention relates to compounds having high surface-activity in aqueous solutions and to processes for preparing the said compounds.

In my prior Patents Nos. 2,508,035 and 2,508,036, issued May 16, 1950, I have disclosed polyglycol ethers of certain branched chain alcohols, namely, 5-ethylnonanol-2 and 2-n-propylheptanol. These products are produced by condensing ethylene oxide with the respective alcohols. While these compounds show especially low and therefore advantageous wetting out speeds when aqueous solutions thereof are tested by the Draves test, these products have been found to be somewhat deficient in detergency.

I have now found that if at least 5, but less than 21, moles of ethylene oxide can be condensed with 2,6,8-trimethylnonanol-4 that a series of products is obtained which exhibit not only excellent wetting out properties but also excellent detergency. As a matter of fact, the detergency of the present products is superior to that of the corresponding products made from the above alcohols.

Relative detergency may be measured by any quantitative method; however for the purpose of evaluating the present and related products I have used the method described by Jay C. Harris in Soap and Sanitary Chemicals for August and September, 1943. By the application of this method it is possible to evaluate the detergency of a product in terms of any standard detergent. For convenience I have compared the detergency of the present and related products with the detergency of Gardinol, which is a commercial detergent product produced by sulfating the alcohols derived by hydrogenation of cocoanut oil fatty acids.

The detergency of the present and related products as determined by the Harris method is illustrated in the following table:

| Product Tested | Detergency, Percent of Gardinol | | | |
|---|---|---|---|---|
| | 100% Active | | Built [1] | |
| | 50 p. p. m. | 300 p. p. m. | 50 p. p. m. | 300 p. p. m. |
| 2-n-Propyl-heptanol+5 moles ethylene oxide | 50 | 45 | 111 | 106 |
| 2-n-Propyl-heptanol+10 moles ethylene oxide | 100 | 78 | 99 | 109 |
| 2-n-Propyl-heptanol+15 moles ethylene oxide | 102 | 87 | 93 | 109 |
| 5-Ethylnonanol-2+5 moles ethylene oxide | 36 | 37 | 106 | 112 |
| 5-Ethylnonanol-2+10 moles ethylene oxide | 114 | 110 | 110 | 111 |
| 5-Ethylnonanol-2+15 moles ethylene oxide | 110 | 101 | 101 | 116 |
| 2,6,8-Trimethylnonanol-4+5 moles ethylene oxide | 109 | 94 | 107 | 100 |
| 2,6,8-Trimethylnonanol+7.5 moles ethylene oxide | 111 | 101 | 103 | 108 |
| 2,6,8-Trimethylnonanol+10 moles ethylene oxide | 110 | 102 | 102 | 108 |
| 2,6,8-Trimethylnonanol+15 moles ethylene oxide | 109 | 101 | 102 | 103 |

[1] The builder consisted of 40 parts of tetrasodium pyrophosphate, 40 parts of starch for each 20 parts of the active constituent.

The present products are prepared by condensing ethylene oxide with 2,6,8-trimethylnonanol-4 until at least 5 moles, but not in excess of 20 moles, have been condensed with the alcohol. The condensation may be carried out by mixing ethylene oxide either as gas or liquid with the alcohol and heating to a temperature of from 110 to 170° C. The condensation reaction is aided by the presence of a catalyst. For this purpose any alkaline material, such as an alkali metal hydroxide or alcoholate may be used. The catalyst may be employed in relatively small amounts, usually from 0.5% to 1% being employed. The catalyst is added to the liquid alcohol at the beginning of the reaction.

The products so produced are secondary alcohol ethers and are believed to have the structure:

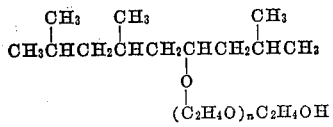

in which $n$ is an integer having a value of from 4 to 19.

The following examples will further illustrate this invention:

EXAMPLE 1

1042 g. (5.6 moles) of 2,6,8-trimethylnonanol-4 was placed in a glass flask, 10.4 g. of powdered KOH added and the contents then heated to 130° C. A stream of gaseous ethylene oxide was passed into the alcohol by means of a gas dispersing tube and the stream continued until 1865 g. of ethylene oxide had combined. The mass became hot due to the exothermic reaction and the temperature was controlled by cooling the flask by the application of cold water to the exterior. In this way the temperature was maintained at about 150° C. during the progress of the reaction.

The product obtained corresponds to the pentaethylene glycol ether of 2,6,8-trimethylnonanol-4.

EXAMPLE 2

A portion of the product obtained above, weighing 1059 g. was further treated with 286 g. of ethylene oxide using the same apparatus as described above. There was thus obtained a 7.5:1 molar ratio ethylene oxide-2,6,8-trimethylnonanol-4 condensation product.

EXAMPLE 3

A portion of the product obtained in Example 2, weighing 915 g. was further treated with 194 g. of ethylene oxide using the same apparatus as described above. The product obtained corresponded to the decaethylene glycol ether of 2,6,8-trimethylnonanol-4.

EXAMPLE 4

A portion of the product obtained in Example 3, weighing 458 g. was treated with 160 g. of ethylene oxide in the manner described above. The product corresponded to the pentadecyl ethylene glycol ether of 2,6,8-trimethylnonanol-4.

The speed of wetting, as measured by the Draves test of the products when dissolved in water to form a 0.5% solution gave the following values:

Table

| Product Tested | Speed of Wetting, Seconds |
|---|---|
| Example 1 | 4.0 |
| Example 2 | 3.7 |
| Example 3 | 3.4 |
| Example 4 | 4.4 |

What I claim is:
1. Compounds having the formula:

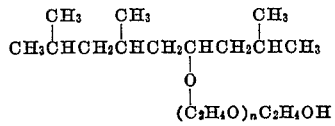

in which $n$ has a value of at least 4 but not in excess of 20.

2. Compounds having the formula:

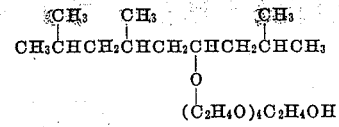

3. Compounds having the formula:

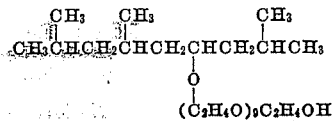

4. Compounds having the formula:

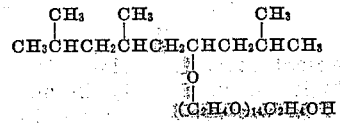

5. The process which comprises passing ethylene oxide into 2,6,8-trimethylnonanol-4, at a temperature of from 110° C. to 170° until at least 5 moles, but less than 21 moles, of said ethylene oxide have combined with each mole of said 2,6,8-trimethylnonanol-4.

MILTON KOSMIN.

References Cited in the file of this patent
UNITED STATES PATENTS

| Number | Name | Date |
|---|---|---|
| 1,696,874 | Young | Dec. 25, 1928 |
| 1,970,578 | Schoeller et al. | Aug. 21, 1934 |
| 2,164,431 | Schoeller et al. | July 4, 1939 |
| 2,226,119 | De Groote et al. | Dec. 24, 1940 |
| 2,326,842 | Coleman | Aug. 20, 1943 |
| 2,355,823 | Schlegel | Aug. 15, 1944 |
| 2,491,533 | Swern | Dec. 20, 1949 |
| 2,508,035 | Kosmin | May 16, 1950 |
| 2,508,036 | Kosmin | May 16, 1950 |
| 2,527,970 | Sokol | Oct. 31, 1950 |